(12) United States Patent
Mohamed et al.

(10) Patent No.: US 7,617,256 B2
(45) Date of Patent: Nov. 10, 2009

(54) REMOTE FILE UPDATES THROUGH REMOTE PROTOCOL

(75) Inventors: Ahmed H. Mohamed, Sammamish, WA (US); David Kruse, Kirkland, WA (US); Thomas A. Langan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 10/954,747

(22) Filed: Sep. 30, 2004

(65) Prior Publication Data

US 2006/0026165 A1    Feb. 2, 2006

Related U.S. Application Data

(60) Provisional application No. 60/589,145, filed on Jul. 19, 2004.

(51) Int. Cl.
*G06F 12/00* (2006.01)
*G06F 15/16* (2006.01)

(52) U.S. Cl. ............... 707/203; 707/200; 709/201; 709/203

(58) Field of Classification Search ......... 707/1–206; 709/203, 230
See application file for complete search history.

(56) References Cited

U.S. PATENT DOCUMENTS

| | | | |
|---|---|---|---|
| 4,399,504 A | 8/1983 | Obermarck et al. | |
| 4,780,821 A | 10/1988 | Crossley | |
| 4,791,566 A | 12/1988 | Sudama et al. | |
| 4,825,354 A | 4/1989 | Agrawal et al. | |
| 4,887,204 A * | 12/1989 | Johnson et al. | ............ 707/10 |
| 4,891,785 A | 1/1990 | Donohou | |
| 4,914,570 A | 4/1990 | Peacock | |
| 5,008,853 A | 4/1991 | Bly et al. | |
| 5,109,519 A | 4/1992 | Zimmet et al. | |
| 5,113,519 A * | 5/1992 | Johnson et al. | ............ 707/201 |

(Continued)

FOREIGN PATENT DOCUMENTS

EP    0438571    7/1991

(Continued)

OTHER PUBLICATIONS

Microsoft Windows Server 2003 Is Available Worldwide Today, Microsoft PressPass Press Release from Apr. 24, 2003.*

(Continued)

*Primary Examiner*—Hung Q Pham
*Assistant Examiner*—Hubert Cheung
(74) *Attorney, Agent, or Firm*—Merchant & Gould P.C.

(57) ABSTRACT

An improved remote protocol enables efficient and reliable updating of files on a remote server. A gather-copy extension to a remote protocol enables a client to instruct a server to gather portions of data from an existing source file on the server and to copy those portions of data to appropriate offsets within a new destination file on the server. The gather-copy extension thus enables the client to leave blank locations in the destination file into which the client can write new data during a file update. The gather-copy extension also enables the client to effectively delete portions of the source file by not copying them from the source file to the destination file. File updates can therefore be made without having to transfer the entire file from the client to the server.

27 Claims, 8 Drawing Sheets

U.S. PATENT DOCUMENTS

| | | | |
|---|---|---|---|
| 5,202,971 A | 4/1993 | Henson et al. | |
| 5,218,696 A | 6/1993 | Baird | |
| 5,261,051 A | 11/1993 | Masden et al. | |
| 5,265,261 A | 11/1993 | Rubin et al. | |
| 5,349,642 A * | 9/1994 | Kingdon | 713/161 |
| 5,375,207 A | 12/1994 | Blakely et al. | |
| 5,410,697 A | 4/1995 | Baird et al. | |
| 5,437,013 A | 7/1995 | Rubin et al. | |
| 5,452,447 A | 9/1995 | Nelson et al. | |
| 5,491,752 A | 2/1996 | Kaufman et al. | |
| 5,493,728 A * | 2/1996 | Solton et al. | 711/113 |
| 5,513,314 A * | 4/1996 | Kandasamy et al. | 714/6 |
| 5,535,375 A | 7/1996 | Eshel | |
| 5,560,008 A | 9/1996 | Johnson et al. | |
| 5,588,117 A | 12/1996 | Karp | |
| 5,608,869 A * | 3/1997 | Hamstra et al. | 709/250 |
| 5,628,005 A * | 5/1997 | Hurvig | 707/8 |
| 5,764,887 A | 6/1998 | Kells | |
| 5,845,280 A * | 12/1998 | Treadwell et al. | 707/8 |
| 5,860,022 A * | 1/1999 | Kondou et al. | 710/1 |
| 5,931,913 A | 8/1999 | Meriwether | |
| 5,931,925 A * | 8/1999 | McNabb et al. | 710/52 |
| 5,978,791 A * | 11/1999 | Farber et al. | 707/2 |
| 5,978,802 A * | 11/1999 | Hurvig | 707/8 |
| 6,061,768 A * | 5/2000 | Kuo et al. | 711/156 |
| 6,065,010 A * | 5/2000 | Otsuka et al. | 707/101 |
| 6,088,737 A * | 7/2000 | Yano et al. | 709/235 |
| 6,092,199 A | 7/2000 | Dutcher | |
| 6,101,505 A * | 8/2000 | Sun | 707/203 |
| 6,208,952 B1 | 3/2001 | Goertzel | |
| 6,219,799 B1 | 4/2001 | Kandasamy | |
| 6,324,581 B1 * | 11/2001 | Xu et al. | 709/229 |
| 6,349,250 B1 | 2/2002 | Hart et al. | |
| 6,349,349 B1 * | 2/2002 | Fujita et al. | 710/35 |
| 6,349,350 B1 | 2/2002 | Hathorn et al. | |
| 6,401,123 B1 | 6/2002 | Shields | |
| 6,415,280 B1 * | 7/2002 | Farber et al. | 707/2 |
| 6,430,691 B1 | 8/2002 | Di Santo et al. | |
| 6,438,691 B1 | 8/2002 | Mao | |
| 6,452,903 B1 | 9/2002 | Peck et al. | |
| 6,453,354 B1 | 9/2002 | Jiang | |
| 6,587,921 B2 * | 7/2003 | Chiu et al. | 711/119 |
| 6,658,476 B1 | 12/2003 | Van | |
| 6,757,698 B2 * | 6/2004 | McBride et al. | 707/204 |
| 6,757,705 B1 | 6/2004 | Pardikar et al. | |
| 6,850,962 B1 * | 2/2005 | Povolny et al. | 709/203 |
| 6,910,082 B1 * | 6/2005 | Marcotte | 709/246 |
| 7,039,659 B2 * | 5/2006 | LeCrone et al. | 707/203 |
| 7,424,548 B1 * | 9/2008 | Shigeeda et al. | 709/238 |
| 2002/0004857 A1 * | 1/2002 | Arakawa et al. | 710/1 |
| 2002/0019874 A1 * | 2/2002 | Borr | 709/229 |
| 2003/0112754 A1 * | 6/2003 | Ramani et al. | 370/230 |
| 2003/0140129 A1 | 7/2003 | Livnat | |
| 2003/0195974 A1 * | 10/2003 | Ronning et al. | 709/230 |
| 2003/0212992 A1 * | 11/2003 | Ronning et al. | 717/178 |
| 2004/0139097 A1 * | 7/2004 | Farber et al. | 707/100 |
| 2004/0215794 A1 | 10/2004 | Lauer | |
| 2004/0260748 A1 | 12/2004 | Springer | |
| 2004/0267932 A1 | 12/2004 | Voellm | |
| 2005/0010670 A1 | 1/2005 | Greschler et al. | |
| 2005/0033748 A1 * | 2/2005 | Kazar et al. | 707/10 |
| 2005/0060442 A1 | 3/2005 | Beverly | |
| 2005/0138528 A1 | 6/2005 | Ameigeiras | |
| 2005/0182850 A1 | 8/2005 | Kohno | |
| 2005/0198113 A1 | 9/2005 | Mohamed | |
| 2005/0262103 A1 * | 11/2005 | Stakutis et al. | 707/10 |
| 2006/0271692 A1 | 11/2006 | Kruse et al. | |
| 2006/0271695 A1 | 11/2006 | Lavian | |

FOREIGN PATENT DOCUMENTS

| | | | |
|---|---|---|---|
| EP | 1259045 | | 11/2000 |
| JP | 7-28682 | * | 1/1995 |
| JP | 07028682 A | * | 1/1995 |
| WO | WO03096646 | | 11/2003 |

OTHER PUBLICATIONS

"Network-aware partial caching for Internet streaming media", Multimedia Systems, vol. 9, No. 4, Oct. 2003, pp. 386-396.

Khushraj, "INCCODA-Incremental Hoarding and Reintegration in Mobile Enviornments", Master Thesis, retrieved from the Internet on Nov. 8, 2005, Available at <<http://fulltext.fcla.edu/DLData/FC/ETD_UF_01_summer/abhinav/masterprepdf4.pdf>>, 2001, pp. 1-51.

Helal A et al., "Incremental Hoarding and Reintegration in Mobile Enviornments", Proceedings of the 2002 Symposium of Applications and the Internet, pp. 8-11.

Coppieters K, "A Cross-Platform Binary Diff", Dr Dobbs Journal, May 1995, pp. 32, 35-36.

The Zebra Striped Network File System (Scientific Paper) John Henry Hartman Publication Date: 1994 http://www.cl.cam.ac.uk/Research/SRG/netos/plana/dump/zebra.pdf.

Inside Microsoft Networking (Scientific Paper) Andrew Tridgell Publication Date: Jun. 25, 1998 http://public.www.planetmirror.com/pub/sage-au/Conference-Papers/sage-au98/tridgell/tridgell.ps.

Leach, et al., "CIFS/E Browser Protocol," Internet Working Group, Jan. 10, 1997. (draft-leach-cifs-browser-spec-00.txt).

Leach, et al., "CIFS Logon and Pass Through Authentication," Internet Working Group, Jan. 3, 1997. (draft-leach-cifs-logon-spec-00.txt).

Leach, et al., "CIFS Printing Specification," Internet Working Group, Jan. 31, 1997. (draft-leach-cifs-print-spec-00.txt).

Leach, et al., "CIFS Remote Administration Protocol," Internet Working Group, Feb. 26, 1997. (draft-leach-cifs-rap-spec-00.txt).

Leach, et al., "A Common Internet File System (CIFS/1.0) Protocol," Internet Working Group, Mar. 13, 1997. (draft-leach-cifs-v1-spec-02.txt).

Talpey, Tom. "NFSv4 Session Extensions," IETF Standard-Working-Draft, Internet Engineering Task Force, IETF, CH, vol. 1, nfsv4, No. 1, Feb. 2005; pp. 1-68.

Shepler, S.; Callaghan, B.; Robinson, D.; Thurlow, R. "Network File System (NFS) version 4 Protocol," Sun Microsystems S et al, IETF Standard, Internet Engineering Task Force, IETF, CH, Apr. 2003, pp. 1-275.

"MSRPC Update and SMB Update," May 20, 2004, [2 pages]. http://marc.theaimsgroup.com/?1=nfr-users&m=108509229309130&w=2> (retrieved on Jan. 18, 2006).

Geenberg S, Keene B, "NFILE—A File Access Protocol," IETF Standard, Internet Engineering Task Force, IETF, CH, XP015005976, ISSN : 0000-0003, Dec. 1987, pp. 1-86.

Gu, Yunhong et al. "SABUL: A High Performance Data Transfer Protocol," (Publication date not available), [11 pages].

Pawlowski, Brian et al. "The NFS Version 4 Protocol" (Publication date not available), [20 pages].

Alvisi, Lorenzo et al. "Low-Overhead Protocols for Fault-Tolerant File Sharing," Department of Computer Science, The University of Texas at Austin, May 26-29, 1998, [10 pages].

Vanwasi, A.K. "Unleashing the power of P2P," 2001, [5 pages].

Hiltunen, Matti et al. "Implementing Integrated Fine-Grain Customizable QoS using Cactus,"1999, [2 pages].

Pranevich, Joseph. "The Wonderful World of Linux 2.6," 2003, [17 pages].

CIFS http://msdn.microsoft.com/library/default.asp?url=/library/en-us/cifs/protocol/cifs.asp.

CIFS or Public SMB Information on Common Internet File System http://support.microsoft.com/default.aspx?scid=kb;en-us;199072.

Microsoft SMB Protocol and CIFS Protocol Overview http://msdn.microsoft.com/library/default.asp?urp=/library/en-us/filejo/fs/microsoft_smb_protocol_and_cifs_protocol_overview.asp.

Satyandrayanan, Mahadev et al., *Scalable, Secure and Highly Available Distributed file Access*, Computer, May 1990, pp. 9-21.
Szczerbina, P., *Novell's NetWare Core Protocol*, Dr. Dobb's Journal, Nov. 1993, pp. 123-132.
Morris, J.H., *Andrew: A Distributed Personal Computing Environment*, Communications of the ACM, vol. 29, No. 3, Mar. 1986, New York, pp. 184-201.
Mullender, S.J., *A Distributed File Service Based on Optimistic Concurrency Control*, Proceedings of the Tenth ACM Symposium on Operating Systems Principles, Dec. 1-4, 1985, Orcas island, WA, pp. 51-62.
Linn, J., *Generic Security Service Application Program Interface Version Version 2, Update 1*, RFC 2743, Jan. 2000, http://www.ieft.org/rfc/rfc2743.txt.
Internet Assigned Numbers Authority, *Well-Known Port Numbers*, http://www.iana.org/assignments/port-numbers.
Rivest, R., *The MD5 Message-Digest Algorithm*, RFC 1321, Apr. 1992, http://www.ietf.org/rfc/rfc1321.txt.
Krawczyk, J. et al., *HMAC: Keyed-Hashing for Message Authentication*, RFC-2104, Feb. 1997, http://www.ietf.org/rfc/rfc2104.txt.
Klima, V., "Tunnels in Hash Functions: MD5 Collisions Within a Minute," Cryptology ePrint Archive, Mar. 2006, http://eprint.iacr.org/2006/105.pdf.
Zhu, L., Leach, P., Jaganathan, K., and Ingersoll, W., "The Simple and Protected Generic Security Service Application Program Interface (GSS-API) Negotiations Mechanism," RFC-4178, Oct. 2005, http://www.ietf.org/rfc/rfc4178.txt.
Leach, Paul; Naik, Dilip C., *A Common Internet File System (CIFS/1.0) Protocol*, Draft-leach-cifs-v1-spec-02, Mar. 13, 1997, http://www.microsoft.com/mscorp/ip/protocols/BSTD/CIFS.
U.S. Appl. No. 10/021,392, filed Dec. 2001.
"Common Internet File System (CIFS) Technical Reference, Revision: 1.0," SNIA, Released Mar. 1, 2002, [150 pages]. Available at: http://www.snia.org/tech_activities/CIFS/CIFS-TR-1p00_FINAL.pdf.
"IBM Personal Computer Seminar Proceedings," The IBM PC Network Program, vol. 2, No. 5, Sep. 1984, pp. 23-34.
"Implementing CIFS The Common Internet FileSystem," retrieved Jul. 13, 2007, [3 pages]. Available at: http://ubiqx.org/cifs/.
"Open Content," Open Publication License, v 1.0, Jun. 1999, [3 pages]. Available at: http://www.opencontent.org/openpub/.
"Opening Windows to a Wider World," SAMBA [4 pages]. Available at: http://us4.samba.org/samba/(1992).
"Protocols for X/Open PC Interworking: SMB, Version 2," The Open Group, Sep. 1992, [534 pages].
The Java CIFS Client Library,: jCIFS, [8 pages]. Available at: http://jcifs.samba.org/.
"TOPS-20," Wikipedia, [4 pages]. Available at: http://en.wikipedia.org/wiki/TOPS-20.
Aboba, B. et al. "Extensible Authentication Protcol (EAP)," RFC 3748, Jun. 2004, [63 pages].
Almeida, Danilo, "FIFS: A Framework for Implementing User-Mode File Systems in Windows NT," Proceedings of the $3^{rd}$ USENIX Windows NT Symposium, Jul. 12-15, 1999, pp. 123-134.
Asokan N., Tsudik, G. And Waidner, M. "Server-supported signatures," Journal of Computer Security, 1997, pp. 1-13.
Bensaou, Brahim, et al. "Credit-Based Fair Queuing (CBFQ): A Simple Service-Scheduling Algorithm for Packet-Switched Networks," IEEEIACM Transactions on Networking vol. 9 Issue 5 (Oct. 2001) pp. 591-604.
Gifford, David K. "The Cedar File System," Communications of the ACM, vol. 31, No. 3, Mar. 1988, pp. 288-298.
Khushraj, A. "Inccoda-Incremental Hoarding and Reintegration in Mobile Environments," Master These [Online] 2001, pp. 1-51, AP002353177 Flordia, US Retrieved from the Internet: URL:http://fulltext.fcla.edu/DLData/FC/ETD_UF_01_summer/abhinav/masterprepdf4.pdf.
Leach, P. And Naik, D.C. "A Common Internet File System (CIFS/1.0) Protocol", Internet-Draft, Dec. 19, 1997, [132 pages].
Satran, J. et al. "Internet Small Computer Systems Interface. (iSCSI)," RFC 3720, Apr. 2004, [67 pages].

Soules, Craig A.N., et al. "Metadata Efficiency in a Comprehensive Versioning File System," School of Computer Science, May 2002, [33 pages].
ANSI, *Financial Institution Message Authentication (Wholesale)*, Financial Services Technical Publication, ANSI X9.9-1994, Aug. 15, 1986.
Bensaou et al., *Credit-Based Fair Queueing (CBFQ): A Simple Service-Scheduling Algorithm for Packet-Switched Networks*, IEEE/ACM Transactions on Networking, vol. 9, No. 5, Oct. 2001.
CIFS [online], [Retrieved Jul. 13, 2007], Retrieved from: http://ubiqx.org/cifs/.
*CIFS Oplock File Locking*, MSDN, [Retrieved Jan. 7, 2008], Retrieved from: http://msdn2.microsoft.com/en-us/library/aa302210.aspx.
Dehaese, G., *The ISO 9660 File System* [online], May 1995, [Retrieved Sep. 14, 2007], Retrieved from: http://users.pandora.be/it3.consultants.bvba/handouts/IS09960.html.
Digital Equipment Corporation, *Introduction to RSX-11M* [online, Order No. AA-L763B-TC, RSX-11M Version 4.2, First Printing Sep. 1979, Revised Nov. 1981 and Jul. 1985, [Retrieved Aug. 9, 2007], Retrieved from: http://www.computer.museum.uq.edu.au/RSX-11%20Manuals.html.
Digital Equipment Corporation, *RSX-11/M/M-Plus RMS-11 User's Guide* [online], Order No. AA-L669A-TC, Apr. 1983, [Retrieved Aug. 17, 2007], Retrieved from: http://www.computer.museum.uq.edu.au/RSX-11%20Manuals.html.
ECMA, *Volume and File Structure for Write-Once and Rewritable Media using Non-Sequential Recording for Information Interchange $3^{rd}$ Edition* [online], ECMA-167, Jun. 1997, [Retrieved Aug. 9, 2007], Retrieved from: http://www.ecma-international.org/publications/files/ECMA-ST/Ecma-167.pdf.
European Search Report RS113279/US18298905, Jan. 20, 2006.
European Search Report RS113280/US18225105, Jan. 20, 2006.
Hiltunen, M., Schlichting, R., Wong, G., *Implementing Integrated Fine-Grain Customizable QoS using Cactus*, 1999.
Hitz, D., Lau, J., Malcolm, M., *File System Design for an NFS File Server Appliance* [online], Network Appliance, TR 3002, 1994, [Retrieved Aug. 9, 2007], Retrieved from: http://vvww.netapp.com/library/tr/3002.pdf.
Hobbit, *CIFS: Common Insecurities Fail Scrutiny* [online], Avian Research, Jan. 1997, Retrieved from: http://web.textfiles.com/hacking/cifs.txt.
International Organization for Standardization, *Banking—Approved algorithms for message authentication—*, ISO 8731-1, Jun. 1, 1987.
Kent, S., Atkinson, R., *Security Architecture for the Internet Protocol* [online], RFC 2401, Nov. 1998, [Retrieved Jun. 6, 2007], Retrieved from: http://www.ietf.rg/rfc/rfc2401.txt?number=2401.
Kent, S., Atkinson, R., *IP Authentication Header* [online], RFC 2402, Nov. 1998, [Retrieved Aug. 9, 2007], Retrieved from: http://tools.ietf.org/html/rfc2402.
MSPRC Update (Version 11) and SMB Update (Version 3).
Murphy, D., *Origins and Development of TOPS-20* [online], © 1989, 1996, [Retrieved Aug. 9, 2007], Retrieved from: http://www.opost.com/dlm/tenex/hbook.html.
National Institute of Standards, *Computer Data Authentication*, Federal Information Processing Standards Publication 113, May 30, 1985.
Rubin, F., *Message Authentication Using Quadratic Residues* [online], Jan. 31, 1995, [Retrieved Sep. 14, 2007], Retrieved from: http://www.mastersoftware.biz/crypt002.htm.
Satran et al. *Internet Small Computer Systems Interface (iSCSI)* [online], RFC 3720, Apr. 2004, [Retrieved Mar. 3, 2007], Retrieved from: http://www.ietf.org/rfc/rfc3720.txt?number=3720.
Samba Team, *The Samba Team are pleased to announce Samba1.9.18* [online], Jan. 7, 1998, [Retrieved Jan. 4, 2008], Retrieved from: http://de.samba.org/samba/history/samba1.9.18.html.
Schneier, B., *Applied Cryptography Protocols, Algorithm and Source Code in C Second Edition*, John Wiley & Sons, Inc., © 1996.
Shepler, S., *NFS Version 4 Design Considerations* [online], RFC 2624, Jun. 1999, [Retrieved Jan. 4, 2008], Retrieved from: http://tools.ietf.org/html/rfc2624.
Srinivasan, V., Mogul, J., *Spritely NFS: Implementation and Performance of Cache-Consistency Protocols* [online], May 1989,

[Retrieved Jan. 4, 2008], Retrieved from: http://www.hpl.hp.com/techreports/Compaq-DEC/WRL-89-5.pdf.

Tichy, W., *RCS—A System for Version Control* [online], Jan. 3, 1991, [Retrieved Aug. 6, 2007], Retrieved from: http://www.cs.purdue.edu/homes/trinkle/RCS/rcs.ps.

European Search Report/Opinion for Application No. 05106517.5 dated Nov. 9, 2005.

Official Communication for Application No. 05106517.5 dated Sep. 20, 2007.

Official Communication for Application No. 05106517.5 dated Dec. 19, 2006.

Bell Labs, *Plan 9 default Fossil File System* [online], [Retrieved Sep. 17, 2007], Retrieved from: http://plan9.bell-labs.com/magic/man2html/4/fossil.

*The Server Message Block Protocol* [online], 1999, [Retrieved Jun. 5, 2006], Retrieved from: http://ubiqx.org/cifs/SMB.html.

\* cited by examiner

REMOTE FILE UPDATES THROUGH REMOTE PROTOCOL

RELATED CASES

This application claims priority to U.S. Provisional Application No. 60/589,145, filed Jul. 19, 2004.

TECHNICAL FIELD

The present disclosure generally relates to client-server protocols, and more particularly to an extension to such protocols that enables reliable and efficient remote file updates.

BACKGROUND

With the proliferation of mobile technologies, more and more corporations are providing network access to key user data that continues to be moved off of client machines and onto servers. There are significant benefits to making such network data available to mobile users even when they are disconnected from the network. For example, continued access to network data while disconnected from the network allows users to work on files when they travel, when they work at home, or when the network is down. Another benefit to having access to network data while being disconnected from the network is that it reduces the amount of data being transmitted over the network between client and server machines.

Client-side caching is the primary way that mobile users maintain access to network data while being disconnected from the network. Client-side caching allows a mobile user to save a local copy of a file accessed, for example, over a network on a server. After disconnecting from the network, a user is still able to edit the local copy of the file. Upon reconnecting to the network, the copy of the file on the server can be updated.

Various implementations of client-server protocols exist that facilitate client-side caching and enable client applications on a computer to read files, create files, update files, and perform other file system tasks over a network via server programs on a remote computer. The Server Message Block protocol (SMB protocol) is an example of such a protocol that can be used over the Internet on top of the TCP/IP protocol or other network protocols such as Internetwork Packet Exchange and NetBEUI. The typical mode of operation with such protocols is for the client to make requests and the server to send back responses. Thus, such protocols enable a client to invoke certain "file system control" operations with respect to a file system on a remote server.

One of the disadvantages with current methods of client-side caching is the significant latency and response times that can be encountered while transferring data between the client and server. A user wanting to edit a file, for example, first downloads the entire file to the client over the network. The user can then disconnect from the network and edit the file. Upon reconnecting with the server over the network, the entire edited file is uploaded to the server in a synchronization process. Regardless of the size or amount of change made to the original file, the whole edited file must be pushed back over the network to the server. Thus, even the smallest change (e.g., a 1 kilobyte insertion or deletion) made to a 10 megabyte file requires that the entire 10 megabyte file be transferred over the network twice. The latency and response times for such transfers can be particularly problematic for slow links such as telephone lines or satellite links.

Another related disadvantage with current methods of client-side caching is the risk of file corruption during file updates between the client and server. During file synchronization (i.e., a file update from client to server), a network glitch or network failure that occurs part way into the update can leave the file being updated on the server in a corrupted state, which may or may not be automatically recoverable. The longer a file update takes, the more likely it is that a network problem will be encountered during the update, and the higher the risk that the file may be corrupted.

Accordingly, a need exists for a way to improve client-side caching that provides for more efficient and reliable updating of remote files.

SUMMARY

A method and system enable efficient and reliable updating of remote files through an improved remote protocol. A gather-copy extension to a remote protocol enables a client to instruct a server to gather portions of data from an existing source file on the server and to copy those portions of data to appropriate offsets within a new destination file on the server. The gather-copy extension thus enables the client to leave blank locations in the destination file into which the client can write new data during a file update. The gather-copy extension also enables the client to effectively delete portions of the source file by not copying them from the source file to the destination file. File updates can therefore be made without having to transfer the entire file from the client to the server.

BRIEF DESCRIPTION OF THE DRAWINGS

The same reference numerals are used throughout the drawings to reference like components and features.

DETAILED DESCRIPTION

Introduction

The following discussion is directed to a system and methods that provide efficient and reliable updating of files between client and server devices. A remote protocol, generally configured to facilitate client control of various file system tasks on a remote server (e.g., reading, creating, and updating of files), includes an extension that enables the client to update files on the server without having to transfer the entire file from the client to the server. The extension to the remote protocol is a new file system control (fsctl) command that instructs the server to gather blocks of data from an existing source file and to copy the blocks of data at appropriate offsets within a new destination file. The gather-copy fsctl command allows the client to leave (or make) "holes" in the destination file into which it can then write new data, and to delete portions of the source file by not copying portions of the source file into the destination file.

Advantages of the described system and methods include file updates that consume bandwidth proportional in size to file changes, rather than consuming bandwidth proportional in size to whole files. This reduces latency and response times during file updates, along with reducing the risk that a network failure during an update will cause file corruption.

Exemplary Environment

Figure 1:
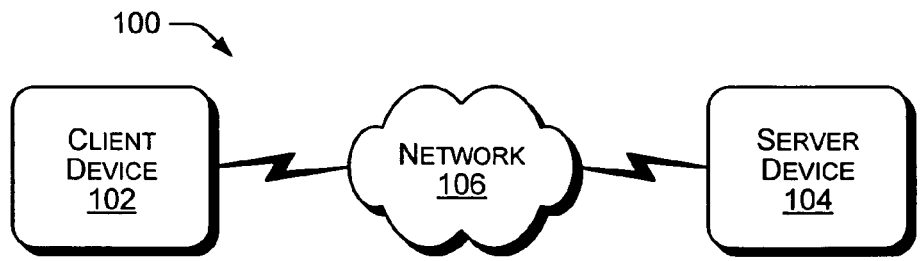
FIG. 1 illustrates an exemplary operating environment suitable for implementing remote file updates through a remote protocol.

FIG. 1 illustrates an exemplary operating environment 100 suitable for implementing remote file updates through a remote protocol. The environment 100 is only one example of a suitable operating environment and is not intended to suggest any limitation as to the scope of use or functionality of the invention. Other well known computing systems, environments, and/or configurations that may be suitable include, but are not limited to, personal computers, hand-held or laptop devices, multiprocessor systems, microprocessor-based systems, programmable consumer electronics, network PCs, minicomputers, mainframe computers, distributed computing environments that include any of the above systems or devices, and the like.

The exemplary operating environment 100 includes client device 102 (generally referred to -hereafter as "client" or "client device") operatively coupled through network 106 to server device 104 (generally referred to hereafter as "server" or "server device"). Network 106 may represent any of a variety of conventional network topologies and types (including optical, wired and/or wireless networks), employing any of a variety of conventional network protocols (including public and/or proprietary protocols). Network 106 may include, for example, a home network, a corporate network, or the Internet, as well as possibly at least portions of one or more local area networks (LANs) and/or wide area networks (WANs).

Client 102 and server 104 communicate using a client/server model in which a client (client program) makes service requests from a server (server program) and the server responds to the requests. The client/server model is based on a communication protocol that generally enables client applications to access and manipulate files on the remote server (e.g., read, edit, update, and create files). Such remote protocols also typically provide clients with access to other server resources such as printers, mail slots, and named pipes. Examples of such protocols may include the Server Message Block (SMB) protocol, the Network File System (NFS) protocol, the WebNFS protocol, the Common Internet File System (CIFS) protocol, Samba, and so on. Such protocols can be used over various networks such as an intranet or the Internet and may run on top of, or in conjunction with, other protocols such as the TCP/IP protocol, the Internetwork Packet Exchange protocol, and the NetBEUI protocol. As discussed herein below with respect to an exemplary embodiment, an extension to such a protocol enables an efficient and reliable update of remote files. Although the below exemplary embodiment describes the protocol extension with regard to the SMB protocol, it is noted that the SMB protocol is only one example of a suitable protocol that may benefit from the described extension. Thus, use of the SMB protocol in the exemplary embodiment is not intended to suggest any limitation as to other suitable protocols to which the extension may apply.

Client 102 is typically capable of performing common computing functions, such as email, calendaring, task organization, word processing, Web browsing, and so on. Client 102 may run an open platform operating system, such as the Windows® operating systems from Microsoft®. Client 102 may be implemented as any of a variety of conventional computing devices, including, for example, a desktop PC, a notebook or portable computer, a workstation, a mainframe computer, an Internet appliance, a gaming console, a handheld PC, a cellular telephone or other wireless communications device, a personal digital assistant (PDA), a set-top box, combinations thereof, and so on. An exemplary computing environment for implementing client 102 is described in more detail herein below with reference to FIG. 9.

Server 104 is generally configured as a file server that provides for the storage and management of data files and other resources. Server 104 provides access to such data and resources to authorized clients through a network 106. Server 104 can be implemented as any of a variety of conventional computing devices such as a desktop PC, a workstation, a mainframe computer, an Internet appliance, and so on. An exemplary computing environment for implementing a server 104 is described in more detail herein below with reference to FIG. 9.

Exemplary Embodiments

Figure 2:
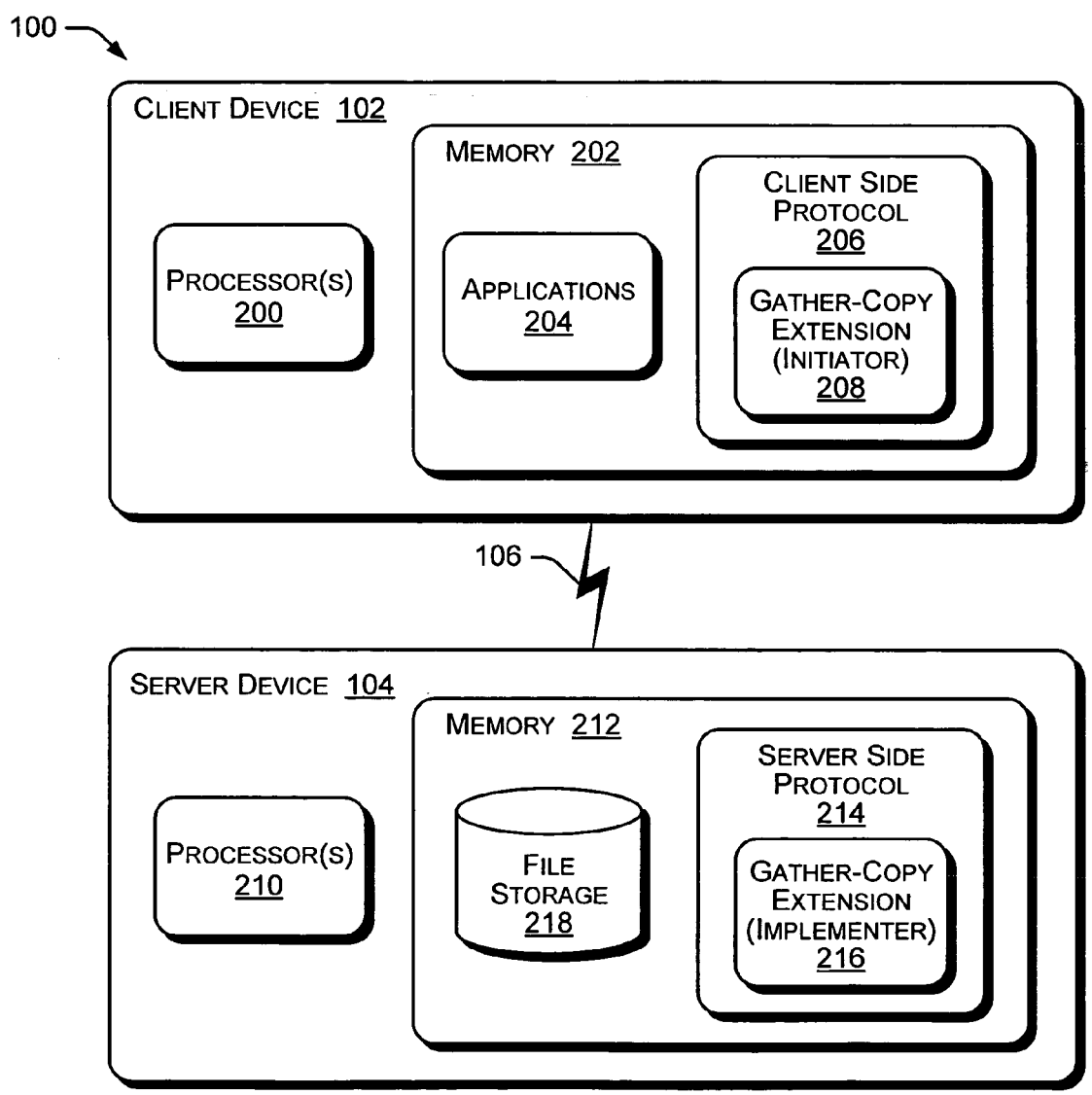
FIG. 2 illustrates an exemplary embodiment of a client device and a server device configured to implement remote file updates through a remote protocol.

FIG. 2 illustrates an exemplary embodiment of a client device 102 and a server device 104 configured to implement remote file updates through a remote protocol. Client 102 includes one or more processors 200 configured to execute application programs 204 stored in a memory 202. Memory 202 also stores a remote protocol referred to in FIG. 2 as client side protocol 206. In the present embodiment, client protocol 206 is implemented as the client side component of the SMB protocol. However, as noted above, client protocol 206 is not limited to the SMB protocol, and may be implemented as various other appropriate protocols including, for example, the NFS protocol, the WebNFS protocol, the CIFS protocol, Samba, and so on. An extension of the client protocol 206 is illustrated in FIG. 2 as a gather-copy extension (initiator) 208, which is discussed below in greater detail with respect to its server counterpart, the gather-copy implementer.

Server 104 includes one or more processors 210 configured to execute a server protocol 216 stored in a memory 212. Server protocol 214 is implemented as the server side component of the SMB protocol. As noted above, the counter part to the gather-copy initiator 208 of client protocol 206 is the gather-copy implementer 216, which is an extension of the server protocol 214. Memory 212 also stores data files in file storage 218.

Client protocol 206 enables various client applications 204 to invoke certain file system control operations on server 104 that provide some type of access to files within file storage 218. Access to files may include, for example, reading a file, updating a file, and creating a new file. Server protocol 214 responds to file system controls from client 102 by performing the requested tasks.

The gather-copy protocol extension (i.e., gather-copy initiator 208, gather-copy implementer 216) to the remote protocol (206, 214) provides a new file system control (fsctl) command that a client application 204 can utilize to effect remote file updates from the client 102 to the server 104. In general, the new gather-copy fsctl command instructs the server 104 how source data is to be copied from a source file on the server 104 into a destination file on the server 104. In one implementation, the gather-copy fsctl command takes a destination file handle, a source file identifier (resume key), and an array of file regions, and returns an error status and a total number of bytes of data copied from the source file to the destination file. Each region in the array of file regions includes a source file offset, a destination file offset, and a length or number of bytes of data to copy/transfer. Thus, each region defines a chunk or block of data to be copied/transferred from a source file to a destination file on the server 104. The source file offset identifies a beginning location within the source file from which a number of bytes of source data (i.e., a chunk of data from the source file) will be copied. The destination file offset identifies a beginning location within the destination file to which the number of bytes of source data will be copied. The length defines the number of bytes to be copied from the source file to the destination file.

Client applications 204 can utilize the new gather-copy fsctl to efficiently implement a server-side only data copy functionality. For example, a client application 204 can utilize this fsctl to update a remote file in an exemplary sequence as follows:

1) Application opens source file with at least READ_DATA access.

2) Application requests a source file identifier (resume key) from the server through an existing fsctl (FSCTL_SRV_REQUEST_RESUME_KEY).

3) Application creates/opens a destination file with at least WRITE_DATA access.

4) Application builds a region list of data blocks to be copied from the source file into the destination file.

5) Application issues the gather-copy fsctl command (FSCTL_SRV_COPYCHUNK) and checks returned status and the number of bytes that are copied.

Figure 3:
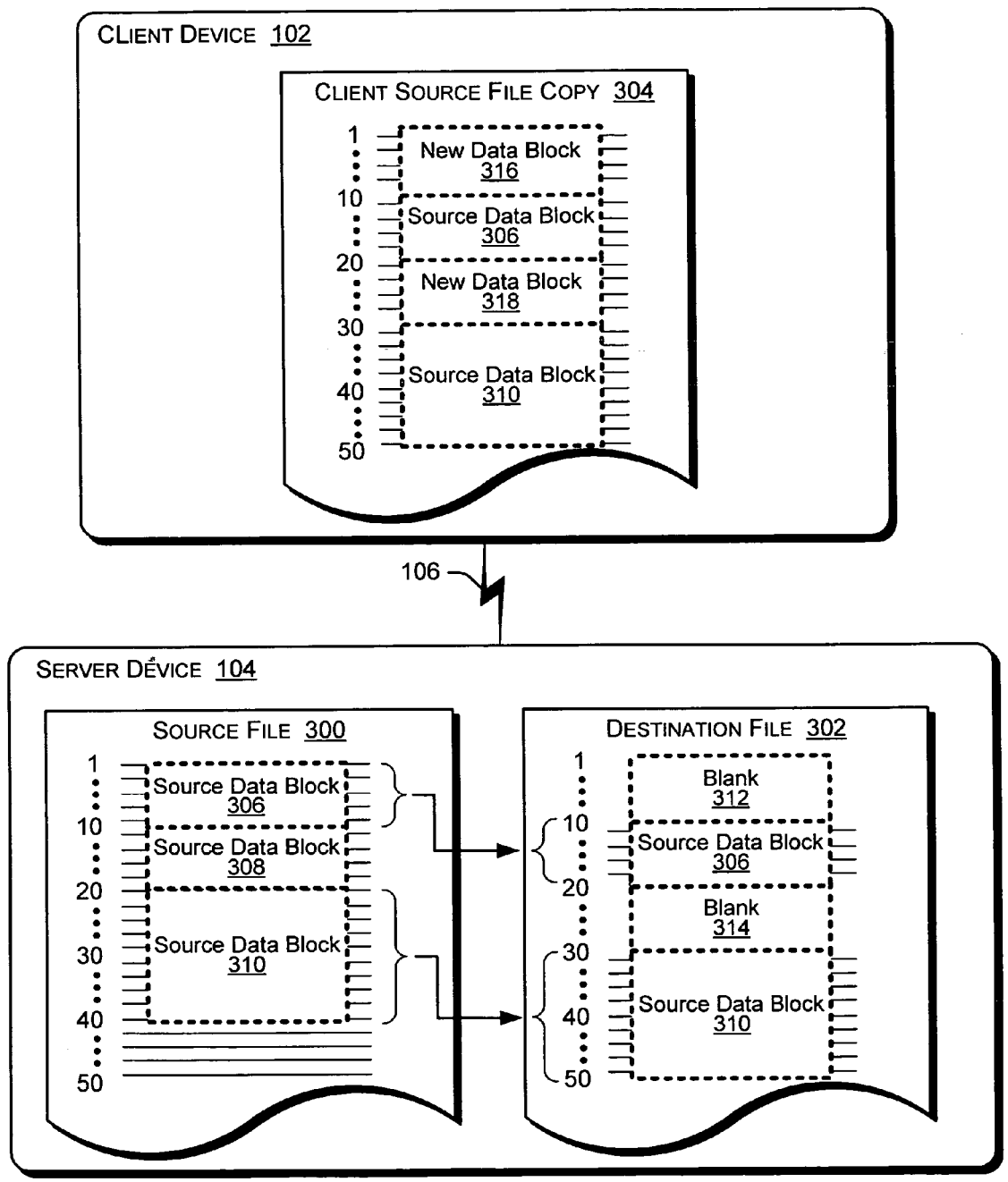
FIG. 3 illustrates an example source file and destination file on a remote server, and an example client copy of the source file on a client.
Figure 4:
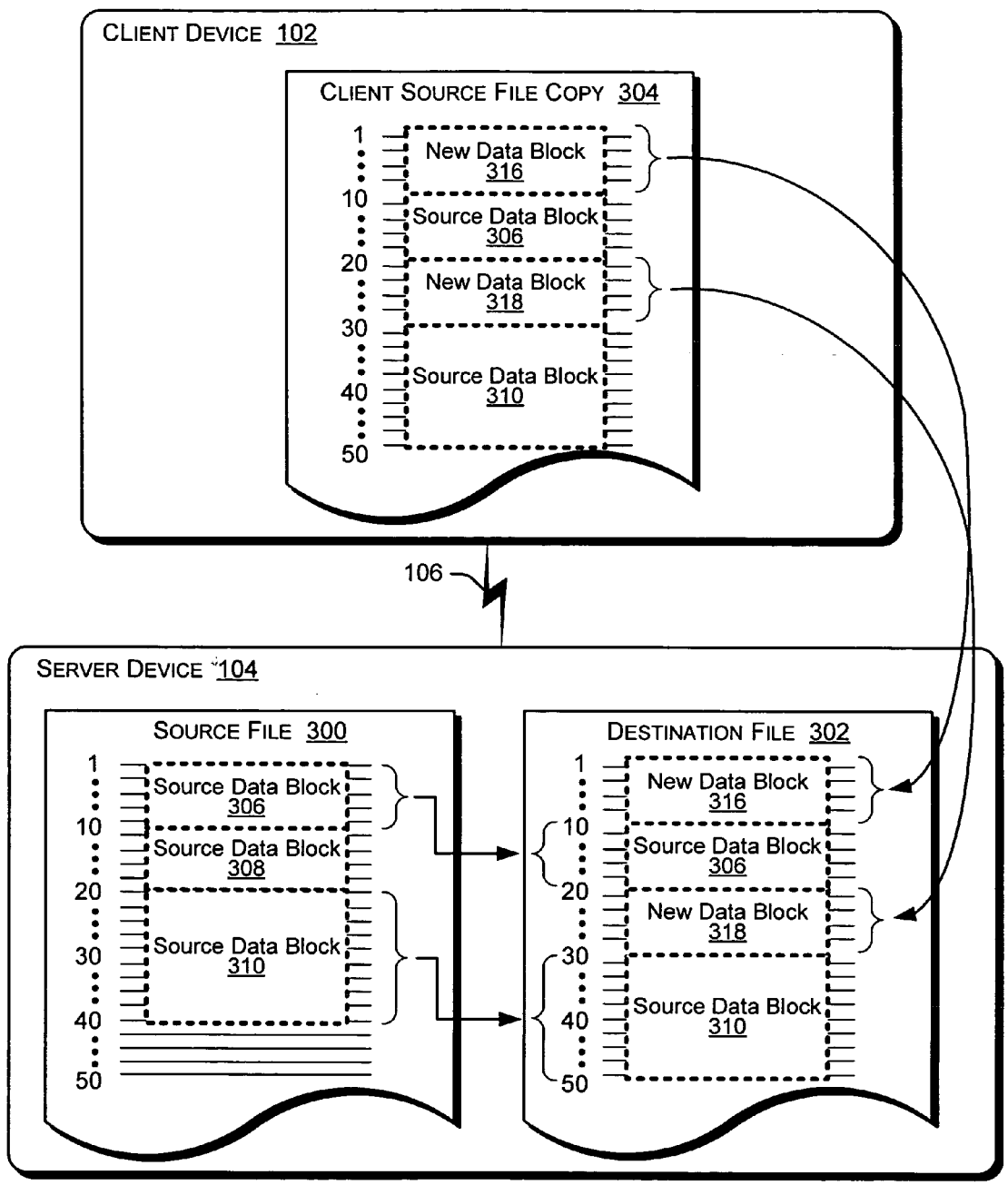
FIG. 4 illustrates an example source file and destination file on a remote server, and an example client copy of the source file on a client.
Figure 5:
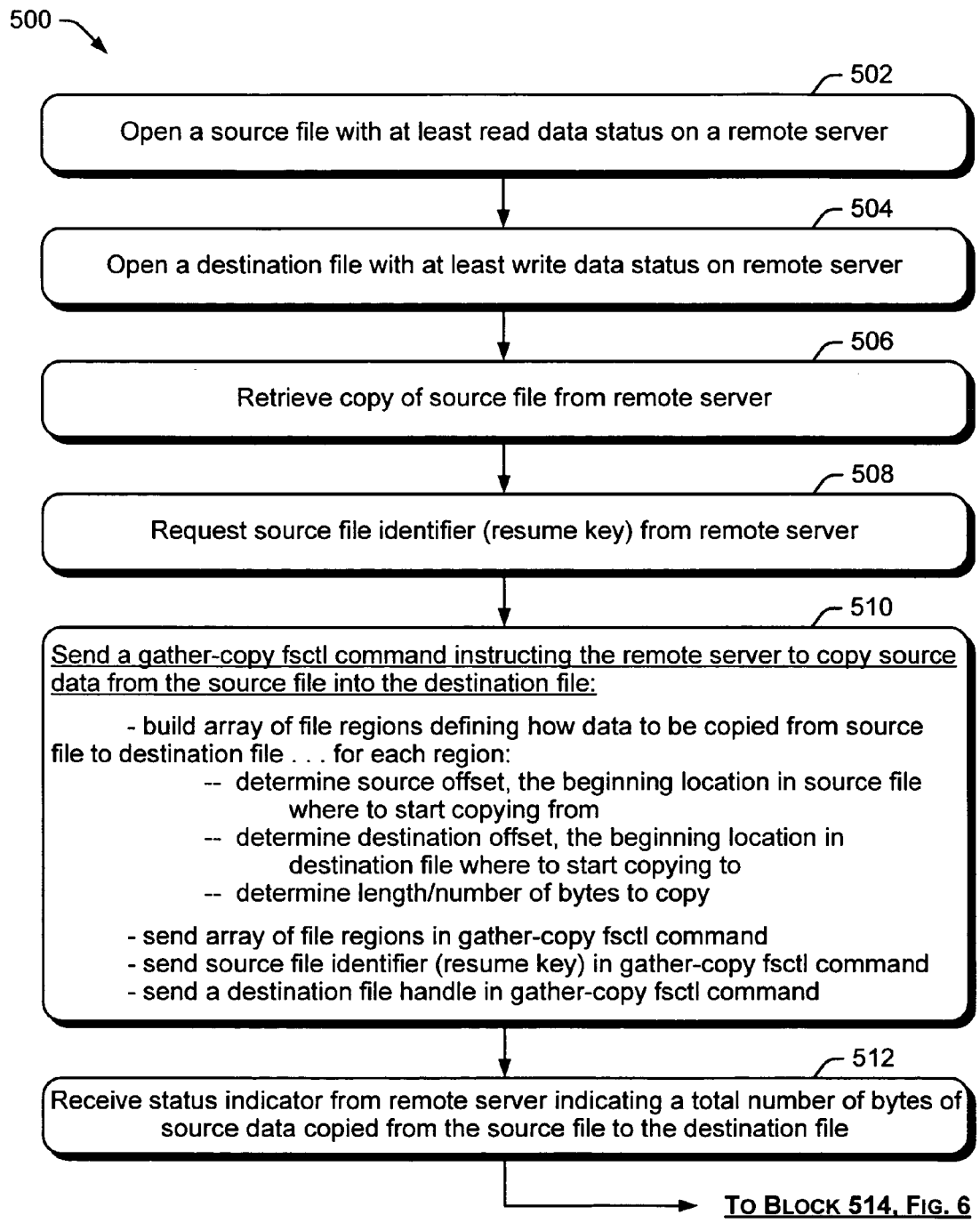
FIGS. 5-8 are flow diagrams illustrating exemplary methods for implementing remote file updates through a remote protocol.
Figure 6:
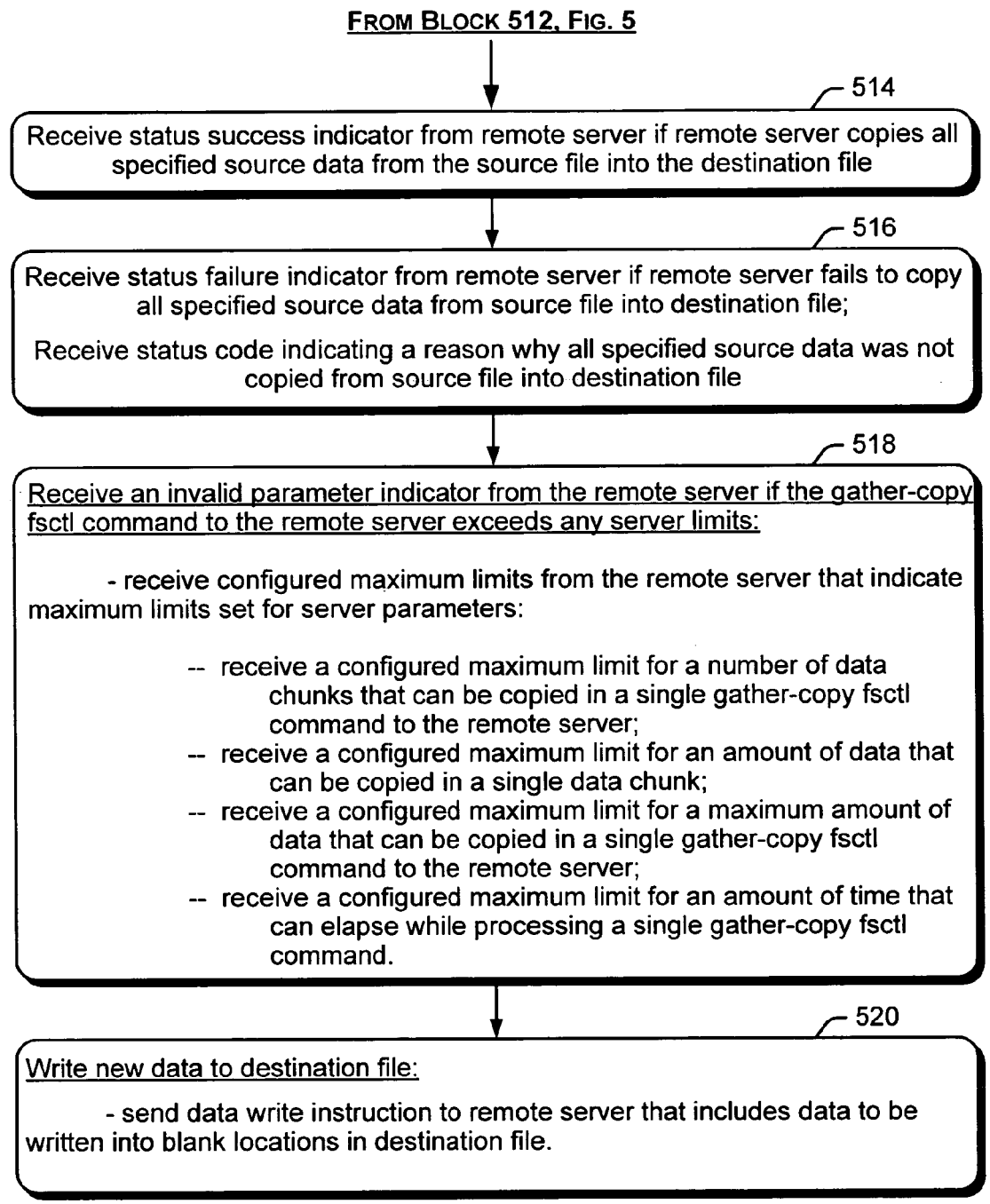

FIGS. 3 and 4 illustrate an example source file 300 and destination file 302 on a remote server 104, and an example client copy 304 of the source file on a client 102. The example source file 300, destination file 302, and source file copy 304 are useful in describing an exemplary process of updating a remote file using the gather-copy protocol extension 208, 216 (gather-copy fsctl command). It is noted that the illustrations in FIGS. 3 and 4 are intended to provide a conceptual example of a remote file update, and are not intended to limit in any way, the actual mechanism or mechanisms by which such a remote file update may occur. In the FIG. 3 example, a client application, such as application 204 (FIG. 2), has opened a source file 300 on server 104 by sending an open request to the server 104. The client application 204 has at least the access needed to read data from the source file 300, and has transferred a source file copy 304 to the client 102. The client application 204 has also requested a source file identifier (resume key) from the server 102, and has created/opened a destination file 302 by sending another open request to the server 104. The client application 204 has at least the access needed to write data to the destination file 302.

The arrows between the source file 300 and destination file 302 on server 104 are intended to indicate that a gather-copy fsctl command has been sent from the client 102 and is being executed on the server 104. The gather-copy process is typically part of a file update process where a user of an application 204 on client 102 has downloaded a source file 300 from server 104, edited the source file 300 as a client copy 304 using an application 204, and is then updating the server 104 with the edited copy.

Based on changes made to the source file copy 304 on the client 102, the gather-copy extension initiator 208 on the client 102 initiates the gather-copy process by generating a gather-copy fsctl command which is sent to the server 104. The gather-copy fsctl command instructs the server 104 to copy sections of the source file 300 into the destination file 302 in a manner consistent with the changes a user/application 204 has made to the source file copy 304 on the client 102. The gather-copy extension implementer 216 on the server 104 interprets and implements the gather-copy fsctl command on the server 104. The arrows between the source file 300 and destination file 302 indicate, in this example, that the gather-copy fsctl command has provided a source file offset of 1, identifying a beginning location within the source file 300 from which a number of bytes of source data will be copied. The gather-copy fsctl command has also provided a length 10, which identifies the number of bytes of data that will be copied. Together, the source file offset and the length define a chunk of data to be copied from source file 300 to destination file 302. In this instance, source data block 306, which begins at offset 1 and ends at offset 10, has been defined by the gathering-copy fsctl command as a block of data to be copied from the source file 300 to the destination file 302.

The illustrated destination file 302 indicates that the gather-copy fsctl command has also provided a destination file offset of 10, identifying a beginning location within the destination file 302 to which the identified number of bytes will be copied. Thus, source data block 306 is copied to the destination file 302, beginning at offset 10 and ending at offset 20, in accordance with the length parameter 10. As noted above, a gather-copy fsctl command may include or define an array of file regions (data blocks) to be copied from a source file 300 to a destination file 302. Thus, in a manner similar to that described above, the gather-copy fsctl command being described with respect to FIG. 3 also instructs the server 104 (i.e., gather-copy extension implementer 216) to copy source data block 310 (source file offset 20, length 20) from the source file 300 to the destination file 302 (destination file offset 30, length 20).

After the gather-copy fsctl command has been executed on the server 104, it is apparent from the destination file 302 that two sections within the destination file 302 are left blank, or devoid of data. The blank sections 312, 314 within destination file 302 have been purposely created by the gather-copy fsctl command in anticipation of new data to be written into these sections 312, 314 in accordance with changes made to the source file copy 304 on client 102. The source file copy 304 on client 102 shows 2 new data blocks 316, 318 that a user has added at 2 different locations within the source file copy 304. Note that the first new data block 316 has effectively relocated the source data block 306 to a new offset position in the source file copy 304, while the second new data block 318 has replaced (i.e., deleted or written over) the original source data block 308 from source file 300. Accordingly, the gather-copy extension initiator 208 has generated the gather-copy fsctl command to instruct the server 104 to copy source data block 306 to an appropriate offset position within destination file 302, and to not copy source data block 308 at all. Thus, source data block 308 is effectively deleted by not being copied into the destination file 302. Instead, the gather-copy fsctl command leaves blank section 314, into which new data will be written.

FIG. 4 illustrates the new data blocks 316, 318 from the source file copy 304 on client 102 being written into the appropriate locations in the destination file 302. A data write from the client 102 to the server 104 takes place in conjunction with the implementation of the gather-copy fsctl command discussed above. However, it is noted that data writes from the client 102 can take place before or after the time that the gather-copy fsctl command is sent to the server 104. That is, as soon as a destination file 302 is created/opened based on an appropriate request from the client 102, data can be copied to the destination file 302 by the server 104 in response to a gather-copy fsctl command from the client 102, or data can be written to the destination file 302 with a data write request from the client 102. In either case, the gather-copy fsctl command instructs the server 102 which data blocks from the source file 300 to copy into the destination file 302 and at what locations to copy the data blocks into the destination file 302. It does not matter if new data from the client 102 is written to the destination file 302 before or after the server 104 executes a gather-copy fsctl command.

A gather-copy fsctl command from the gather-copy protocol extension 208 may be issued on any handle opened with WRITE_DATA access, and its behavior with respect to one implementation can be defined in the following way.

Input Buffer

The input buffer is of type SRV_COPYCHUNK_COPY, defined as follows:

```
typedef struct_SRV_COPYCHUNK
{
    LARGE_INTEGER SourceOffset;
    LARGE_INTEGER DestinationOffset;
    ULONG Length;
}SRV_COPYCHUNK, *PSRV_COPYCHUNK;
typedef struct_SRV_COPYCHUNK_COPY
{
    SRV_RESUME_KEY SourceFile;
    ULONG         ChunkCount;
    ULONG         Reserved;
    SRV_COPYCHUNK Chunk[0]; // Array
}SRV_COPYCHUNK_COPY, *PSRV_COPYCHUNK_COPY;
```

In the input buffer, SourceFile is the resume key (source file identifier) obtained using FSCTL_QUERY_RESUME_KEY from a file opened with at least READ_DATA access. Chunk-Count is the number of SRV_COPYCHUNK structures (source file regions) in the Chunk array. For each SRV_COPYCHUNK structure, SourceOffset is set as the location in SourceFile to copy from and DestinationOffset is set as the offset in the destination handle to copy to. Length will hold the number of bytes to transfer from the source offset to the destination offset.

Output Buffer

The output buffer is of type SRV_COPYCHUNK_RESPONSE, defined as follows:

```
typedef struct_SRV_COPYCHUNK_RESPONSE
{
    ULONG      ChunksWritten;
    ULONG      ChunkBytesWritten;
    ULONG      TotalBytesWritten;
}SRV_COPYCHUNK_RESPONSE,
    *PSRV_COPYCHUNK_RESPONSE;
```

Return Values

The gather-copy fsctl returns STATUS_SUCCESS if the server copies all of the specified chunks (data blocks) from the source file to the destination file. In this case, ChunksWritten in the output buffer should match ChunkCount in the input buffer.

If the server 104 fails to copy a chunk (data block), it will return a status code indicating the reason why the chunk could not be copied. In this case, ChunksWritten in the output buffer will indicate the number of chunks that were successfully copied. Note that the server 104 processes chunks in the order specified by the Chunk array in the input buffer, and it will stop on the first failure.

If the client's 102 request would exceed any of the server's 104 limits, the server 104 will return STATUS_INVALID_PARAMETER. In addition, in this case, the server 104 will return its configured maximum limits in the SRV_COPYCHUNK_RESPONSE using the following translation:

ChunksWritten=maximum chunks SRV allows in a single operation.

ChunkBytesWritten=maximum size of any individual chunk.

TotalBytesWritten=maximum total length of all the chunks summed.

The server 104 returns STATUS_IO_TIMEOUT if the copies are not complete in a specified amount of time (e.g., a default of 25 seconds). Other configuration parameters whose default may be set in the registry include:

ChunkMax=maximum number of chunks that will be copied in a single gather-copy fsctl command. An example default is 256.

ChunkWriteLimit=maximum amount of data that will be copied in a single chunk, specified in bytes. An example default is 1 MB.

ChunkTotalWriteLimit=maximum amount of data that will be copied in a single gather-copy fsctl command, specified in bytes. An example default is 16 MB.

ChunkTimeout=maximum amount of time that may elapse while processing a single gather-copy fsctl command, specified in seconds. An example default is 25 seconds.

Exemplary Methods

Example methods for implementing remote file updates through a remote protocol will now be described with primary reference to the flow diagrams of FIGS. 5-8. The methods apply generally to the exemplary embodiments discussed above with respect to FIGS. 1-4. While one or more methods are disclosed by means of flow diagrams and text associated with the blocks of the flow diagrams, it is to be understood that the elements of the described methods do not necessarily have to be performed in the order in which they are presented, and that alternative orders may result in similar advantages. Furthermore, the methods are not exclusive and can be performed alone or in combination with one another. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), and a portable compact disc read-only memory (CDROM) (optical).

At block 502 of method 500, a source file on a remote server 104 is opened. The source file is opened with at least data read status. The source file is opened by a client application 204 executing on a client 102 and utilizing a remote communication protocol such as the Server Message Block (SMB) protocol, the Network File System (NFS) protocol, the WebNFS protocol, the Common Internet File System (CIFS) protocol, Samba, and so on. At block 504, a destination file is opened on the remote server 104. At block 506, a copy of the source file is retrieved or downloaded from the server 104 to the client 102. At block 508, the client 102 requests an identifier (i.e., a resume key) that identifies the source file.

At block 510, a gather-copy file system control (fsctl) command is sent to the server 104 instructing the server to gather source data from the source file and to copy the source data from the source file into the destination file. A gather-copy extension 208 of the remote protocol generates the gather-copy (fsctl) command based on changes that are made to the copy of the source file retrieved from the server 104. According to changes made to the copy of the source file, an array of file regions is built which defines how the source data is to be copied from the source file into the destination file. The array of file regions, the source file identifier, and a destination file handle are sent in the gather-copy fsctl command. Building the array includes, for each file region in the array, determining a source offset that indicates the beginning location in the source file where the server 104 will begin copying from. A destination offset indicates the beginning location in the destination file where the server 104 will begin copying the source file data to. A length, or number of bytes to copy is also included which determines the length of each source file data block to be copied from the source file into the destination file.

At block 512, the client 102 receives a status indicator from the server 104 indicating the total number of bytes of the specified source data that were copied from the source file to the destination file. The method continues with block 514 of FIG. 6. At block 514, the client 102 receives a success indicator from the server 104 if the server has copied all of the specified source data from the source file to the destination file. At block 516, the client 102 receives a status failure indicator if the server 104 fails to copy all of the specified source data form the source file into the destination file. Along with the status failure indicator, the client 102 receives a status code indicating a reason why all the specified source data was not copied from the source file into the destination file.

At block 518, the client 102 receives an invalid parameter indicator from the server 104 if the gather-copy fsctl command sent to the server 104 exceeds any server limits. If server limits have been exceeded, the client 102 also receives the configured maximum limits from the server 104 which indicate the maximum limits set for server parameters. The configured maximum limits received include a configured maximum limit for a number of data chunks that can be copied in a single gather-copy fsctl (e.g., 256), a configured maximum limit for an amount of data that can be copied in a single data chunk (e.g., 1 MB), a configured maximum limit for an amount of data that can be copied in a single gather-copy fsctl (e.g., 16 MB), and a configured maximum limit for an amount of time that can elapse while processing a single gather-copy fsctl command (e.g., 25 seconds).

At block 520, the client 102 writes new data (i.e., as opposed to source file data) to the destination file at locations in the destination file that are left blank. The client 102 sends a write request to the server that includes the new data to be written, along with the offsets within the destination file indicating where the data is to be written. It is noted that new data can be written to the destination file before or after a gather-copy fsctl command is executed by the server.

Figure 7:
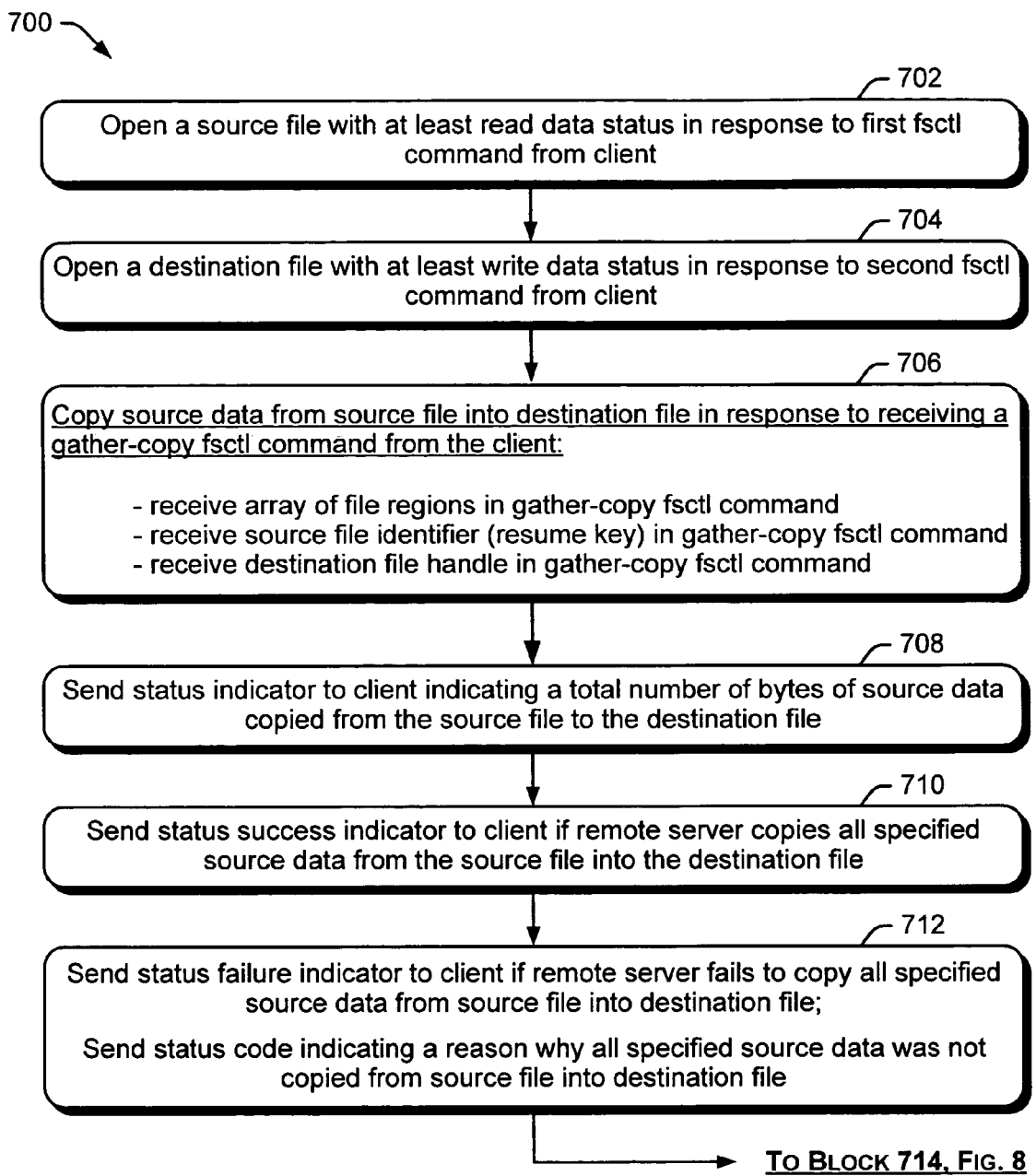

Another method 700 of implementing remote file updates through a remote protocol is illustrated beginning at FIG. 7. At block 702 of method 700, a server 104 opens a source file with at least read data status in response to a first open request from a client 102. At block 704, the server 104 opens a destination file with at least write data status in response to a second open request from the client 102. At block 706, the server 104 copies source data from the source file into the destination file in response to a gather-copy fsctl command received from the client 102. The gather-copy fsctl command includes an array of file regions that define how the source data is to be copied from the source file into the destination file. The array of file regions is built on the client 102 according to changes made to a copy of the source file located on the client 102. Each file region in the array includes a source offset that indicates the beginning location in the source file where the server 104 will begin copying from, a destination offset that indicates the beginning location in the destination file where the server 104 will begin copying the source file data to, and a length, or number of bytes to copy, which determines the length of each source file data block to be copied from the source file into the destination file. The gather-copy fsctl command also includes a source file identifier and a destination file handle.

At block 708, the server 104 sends a status indicator to the client 102 indicating the total number of bytes of the specified source data that were copied from the source file to the destination file. At block 710, the server 104 sends a success indicator to the client 102 if the server has copied all of the specified source data from the source file to the destination file. At block 712, the server 104 sends a status failure indicator if the server 104 fails to copy all of the specified source data from the source file into the destination file. Along with the status failure indicator, the server 104 sends a status code indicating a reason why all the specified source data was not copied from the source file into the destination file.

Figure 8:
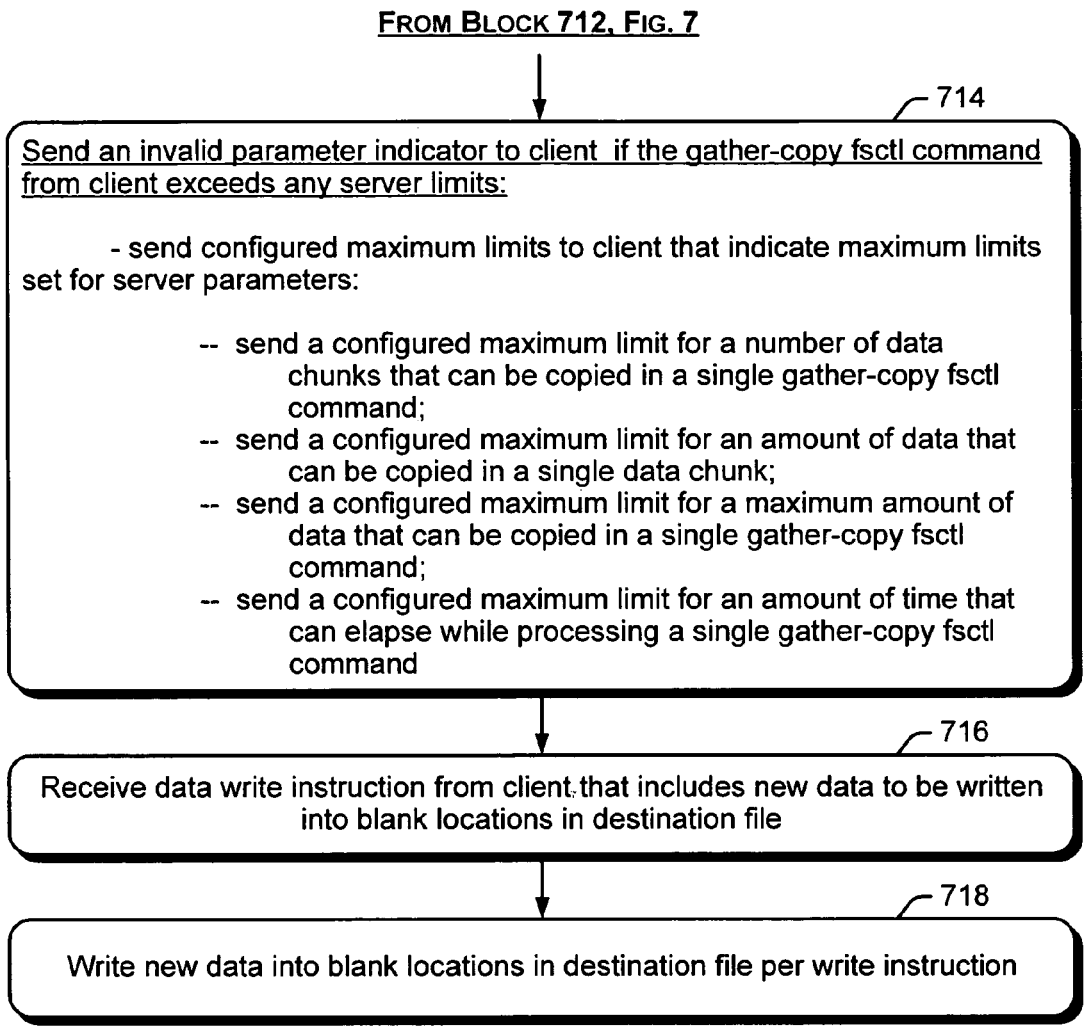

The method 700 continues at FIG. 8 with block 714. At block 714, the server 104 sends an invalid parameter indicator to the client 102 if the gather-copy fsctl command exceeds any server limits. If server limits have been exceeded, the server 104 sends the configured maximum limits from the server 104 which indicate the maximum limits set for server parameters. The configured maximum limits sent include a configured maximum limit for a number of data chunks that can be copied in a single gather-copy fsctl (e.g., 256), a configured maximum limit for an amount of data that can be copied in a single data chunk (e.g., 1 MB), a configured maximum limit for an amount of data that can be copied in a single gather-copy fsctl (e.g., 16 MB), and a configured maximum limit for an amount of time that can elapse while processing a single gather-copy fsctl command (e.g., 25 seconds).

At block 716, the server 104 receives a data write request from the client 102 that includes new data (i.e., as opposed to source file data) to be written to the destination file at locations in the destination file that are left blank. At block 718, the server 102 writes the new data into the blank locations in the destination file according to the write request. It is noted that new data can be written to the destination file before or after a gather-copy fsctl command is executed by the server.

Exemplary Computing Environment

Figure 9:
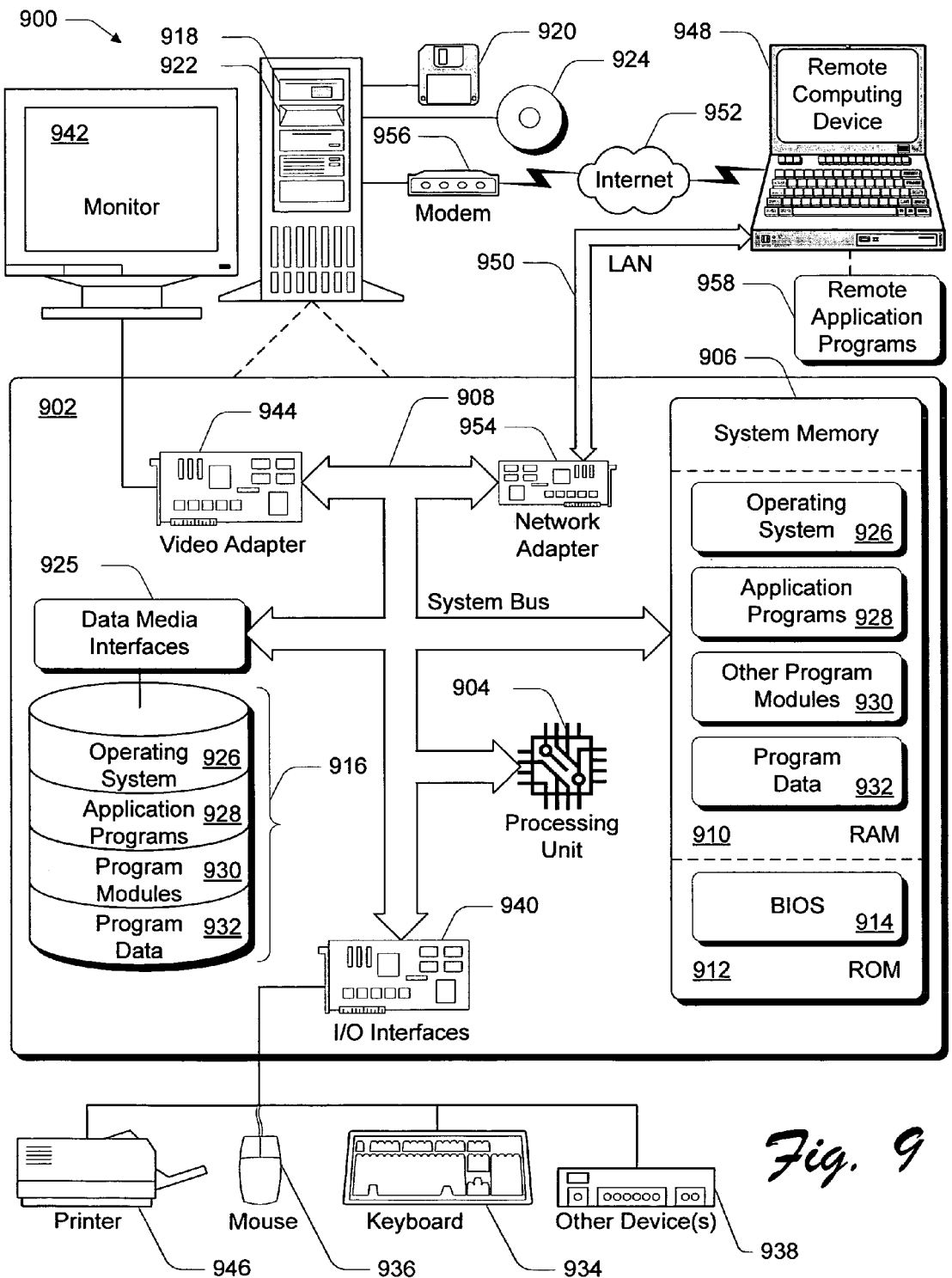
FIG. 9 illustrates an exemplary computing environment suitable for implementing a client computer device and server computer device such as those discussed with reference to FIGS. 1-8.

FIG. 9 illustrates an exemplary computing environment suitable for implementing computer devices such as a client device 102 and a server device 104 as discussed herein above with reference to FIGS. 1-8. Although one specific configuration is shown in FIG. 9, such computing devices may be implemented in other computing configurations.

The computing environment 900 includes a general-purpose computing system in the form of a computer 902. The components of computer 902 may include, but are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. An example of a system bus 908 would be a Peripheral Component Interconnects (PCI) bus, also known as a Mezzanine bus.

Computer 902 includes a variety of computer-readable media. Such media can be any available media that is accessible by computer 902 and includes both volatile and non-volatile media, removable and non-removable media. The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 contains data and/or program modules that are immediately accessible to and/or presently operated on by the processing unit 904.

Computer 902 may also include other removable/non-removable, volatile/non-volatile computer storage media. By way of example, FIG. 9 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 may be connected to the system bus 908 by a SCSI interface (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of a caching scheme for user network access information.

Computer 902 can include a variety of computer/processor readable media identified as communication media. Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device may also be connected to the system bus 908 via an interface, such as a video adapter 944. In addition to the monitor 942, other output peripheral devices may include components such as speakers (not shown) and a printer 946 which can be connected to computer 902 via the input/output interfaces 940.

Computer 902 may operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that may include many or all of the elements and features described herein relative to computer system 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet. When implemented in a LAN networking environment, the computer 902 is connected to a local network 950 via a network interface or adapter 954. When implemented in a WAN networking environment, the computer 902 includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components, such as the operating system, are illustrated herein as discrete blocks, although it is recognized that such programs and components reside at various times in different storage components of the computer system 902, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer implemented method of updating a file, the method comprising:
   storing a copy of a source file at a computer system;
   making changes to the copy of the source file;
   instructing, by the computer system, a remote server to open the source file on the remote server;
   instructing, by the computer system, the remote server to open a destination file on the remote server;
   based on the changes made to the copy of the source file at the computer system, the computer system building an array of file regions that defines how bytes of source data are to be copied from the source file on the remote server and stored in the destination file on the remote server;
   determining, by the computer system, for each file region in the array a source offset, a destination offset, and a length;
   the source offset identifying a beginning location within the source file from which the bytes of the source data will be copied;
   the destination offset identifying a beginning location within the destination file into which the bytes of the source data will be copied;
   the length defining a number of bytes of source data to be copied; and
   sending, by the computer system, to the remote server the array of the file regions in a gather-copy file system control (fsctl) command, wherein the gather-copy fsctl command instructs the remote server to copy the bytes of the source data from the source file on the remote server and store the bytes of the source data in the destination file on the remote server wherein the destination file reflects the changes made to the copy of the source file, wherein the copying occurs without transferring the bytes of the source data from the computer system to the remote server.

2. A method as recited in claim 1, wherein the sending the array of the file regions in the gather-copy fsctl command further comprises:
   sending an identifier of the source file on the remote server; and
   sending a destination file handle.

3. A method as recited in claim 1, further comprising retrieving the copy of the source file from the remote server.

4. A method as recited in claim 1, further comprising requesting from the remote server, an identifier of the source file on the remote server.

5. A method as recited in claim 1, further comprising writing new data to the destination file on the remote server.

6. A method as recited in claim 5, wherein the writing the new data to the destination file on the remote server comprises sending a data write instruction to the remote server that includes data to be written into blank locations in the destination file on the remote server created when the remote server copies the source data from the source file on the remote server into the destination file on the remote server.

7. A method as recited in claim 1, further comprising in response to the remote server failing to store all the bytes of the source data in the destination file on the remote server:
   receiving a status failure indicator from the remote server; and
   receiving a status code indicating a reason why all specified source data was not copied from the source file on the remote server into the destination file on the remote server.

8. A method as recited in claim 1, further comprising in response to the gather-copy fsctl command exceeding server limits:
   receiving an invalid parameter indicator from the remote server; and
   receiving configured maximum limits from the remote server that indicate maximum limits set for server parameters.

9. A method as recited in claim 8, wherein the receiving the configured maximum limits from the remote server comprises:
   receiving a configured maximum limit for a number of data chunks that can be copied in a single gather-copy fsctl command to the remote server;
   receiving a configured maximum limit for an amount of data that can be copied in a single data chunk;
   receiving a configured maximum limit for a maximum amount of data that can be copied in the single gather-copy fsctl command to the remote server; and
   receiving a configured maximum limit for an amount of time that can elapse while processing the single gather-copy fsctl command.

10. A method as recited in claim 1, further comprising receiving a status indicator indicating a total number of bytes of source data stored in the destination file on the remote server.

11. A method as recited in claim 10, wherein the receiving further comprises receiving a status success indicator from the remote server in response to the remote server storing all the bytes of the source data in the destination file on the remote server.

12. A computer storage medium comprising processor-executable instructions for performing the method of claim 1.

13. A computer implemented method comprising:
   opening at a remote server a source file in response to a first open request from a client, the client storing a copy of the source file;
   opening at the remote server a destination file in response to a second open request from the client;
   copying source data from the source file on the remote server and storing the source data in the destination file on the remote server, wherein the destination file at the remote server reflects changes made to the copy of the source file on the remote server, wherein the copying is in response to receiving a gather-copy file system control (fsctl) command from the client and occurs without transferring the source data from the client, the gather-copy fsctl command including sending an array of file regions that defines how the source data is to be copied from the source file on the remote server and stored in the destination file on the remote server, wherein for each file region in the array of the file regions a source offset, a destination offset, and a length is identified;
   the source offset identifying a beginning location within the source file from which the source data will be copied;

the destination offset identifying a beginning location within the destination file into which the source data will be copied; and the length defining a number of bytes of the source data.

14. A method as recited in claim 13, further comprising:
receiving a data write request from the client that includes new data to be written into the destination file on the remote server; and
writing the new data into the destination file on the remote server at offsets that are devoid of source file data.

15. A method as recited in claim 13, further comprising sending a status success indicator to the client in response to all source data specified in the gather-copy fsctl command being copied from the source file on the remote server and stored in the destination file on the remote server.

16. A method as recited in claim 13, further comprising in response to all source data specified in the gather-copy fsctl command not being copied from the source file on the remote server into the destination file on the remote server:
sending a status failure indicator to the client; and
sending a status code indicating a reason why all the specified source data in the gather-copy fsctl command was not copied from the source file on the remote server into the destination file on the remote server.

17. A method as recited in claim 13, further comprising in response to the gather-copy fsctl command exceeding server limits:
sending an invalid parameter indicator to the client; and
sending configured maximum limits to the client that indicate maximum limits set for server parameters.

18. A method as recited in claim 17, wherein the sending the configured maximum limits to the client comprises:
sending a configured maximum limit for a number of data chunks that can be copied in a single gather-copy fsctl command;
sending a configured maximum limit for an amount of data that can be copied in a single data chunk;
sending a configured maximum limit for a maximum amount of data that can be copied in the single gather-copy fsctl command; and
sending a configured maximum limit for an amount of time that can elapse while processing the single gather-copy fsctl command.

19. A method as recited in claim 13, further comprising sending a source file identifier to the client.

20. A method as recited in claim 13, further comprising sending a status indicator to the client indicating a total number of the bytes of the source data copied from the source file on the remote server and stored in the destination file on the remote server.

21. A computer storage medium comprising processor-executable instructions for performing the method of claim 13.

22. A computer storage medium comprising processor-executable instructions configured for:
storing a copy of a source file at a computer system;
making changes to the copy of the source file at the computer system;
instructing, by the computer system, a remote server to open the source file on the remote server and provide at least read data access to the source file on the remote server;
requesting, by the computer system, an identifier of the source file on the remote server from the remote server;
instructing, by the computer system, the remote server to open a destination file on the remote server and provide at least write access to the destination file on the remote server;
based on the changes made to the copy of the source file, the computer system building an array of file regions that identify data blocks to be copied from the source file on the remote server to the destination file on the remote server;
determining, by the computer system, for each file region a source offset that identifies a beginning location within the source file on the remote server from which a number of bytes of source data will be copied;
determining, by the computer system, for each file region a destination offset that identifies a beginning location within the destination file on the remote server to which the number of bytes of the source data will be copied;
determining, by the computer system, the number of bytes of the source data that will be copied; and
instructing, by the computer system, the remote server to copy the identified data blocks in the array of the file regions from the source file on the remote server into the destination file on the remote server so that the destination file on the remote server reflects the changes made to the copy of the source file on the computer system, wherein the copy occurs without transferring the source data from the computer system to the remote server.

23. A computer storage medium as recited in claim 22, further comprises:
receiving a status indicator from the remote server indicating if the remote server successfully copied all of the identified data blocks from the source file on the remote server into the destination file on the remote server.

24. A computer storage medium as recited in claim 22, wherein the instructing the remote server to copy the identified data blocks comprises issuing a gather-copy file system control (fsctl) command to the remote server, the gather-copy fsctl command including the array of the file regions that identify the data blocks to be copied from the source file on the remote server to the destination file on the remote server.

25. A computer storage medium as recited in claim 22, further comprising processor-executable instructions configured for receiving a status indicator indicating a total number of the bytes of the source data copied from the source file on the remote server and stored in the destination file on the remote server.

26. A computer comprising the computer storage medium recited in claim 22.

27. A system for transferring data from a source file on a remote server computer system into a destination file on the remote server computer system, the system comprising:
a client computer system configured to:
store a copy of the source file;
make changes to the copy of the source file;
based on the changes, build an array of file regions that identify data blocks to be copied from the source file on the remote server computer system to the destination file on the remote server computer system;
determine for each file region a source offset that identifies a beginning location within the source file on the remote server computer system from which a number of bytes of source data will be copied;
determine for each file region a destination offset that identifies a beginning location within the destination file on the remote server computer system to which the number of bytes of the source data will be copied;

determine for each file region the number of bytes of the source data that will be copied; and the remote server computer system connected to the client computer system through a network, the remote server computer system configured to:

open a source file on the remote server computer system in response to receiving a file open request from the client computer system;

open the destination file on the remote server computer system in response to receiving a second open request from the client computer system; and copy source data from the source file on the remote server computer system and store the source data in the destination file on the remote server computer system so that the destination file on the remote server computer system reflects the changes made to the copy of the source file, wherein the copying is in response to receiving a gather-copy file system control (fsctl) command and the array of the file regions from the client computer system and occurs without transferring the source data from the client computer system to the remote server computer system.

* * * * *

UNITED STATES PATENT AND TRADEMARK OFFICE
CERTIFICATE OF CORRECTION

| | | |
|---|---|---|
| PATENT NO. | : 7,617,256 B2 | Page 1 of 1 |
| APPLICATION NO. | : 10/954747 | |
| DATED | : November 10, 2009 | |
| INVENTOR(S) | : Ahmed H. Mohamed et al. | |

It is certified that error appears in the above-identified patent and that said Letters Patent is hereby corrected as shown below:

In column 14, line 37, in Claim 10, delete "of" and insert -- of the --, therefor.

Signed and Sealed this
Eighth Day of February, 2011

David J. Kappos
*Director of the United States Patent and Trademark Office*